A driving assistance control device includes an active pedal configured to control a driving and braking force of a vehicle, an electronic control unit configured to detect a potential risk area in which an obstacle entering a scheduled traveling route of the vehicle is likely to be present, and determine a reference speed at which contact between the

(12) United States Patent
Inoue et al.

(10) Patent No.: US 11,572,062 B2
(45) Date of Patent: Feb. 7, 2023

(54) DRIVING ASSISTANCE CONTROL DEVICE

(71) Applicants: TOYOTA JIDOSHA KABUSHIKI KAISHA, Toyota (JP); NATIONAL UNIVERSITY CORPORATION TOKYO UNIVERSITY OF AGRICULTURE AND TECHNOLOGY, Fuchu (JP); THE UNIVERSITY OF TOKYO, Tokyo (JP); SCHOOL JUDICIAL PERSON IKUTOKU GAKUEN, Atsugi (JP)

(72) Inventors: Shintaro Inoue, Kanagawa-ken (JP); Pongsathorn Raksincharoensak, Fuchu (JP); Yuichi Saito, Fuchu (JP); Takuma Ito, Tokyo (JP); Tsukasa Shimizu, Nagakute (JP); Hideo Inoue, Atsugi (JP)

(73) Assignees: TOYOTA JIDOSHA KABUSHIKI KAISHA, Toyota (JP); National University Corporation Tokyo University of Agriculture and Technology, Fuchu (JP); THE UNIVERSITY OF TOKYO, Tokyo (JP); SCHOOL JUDICIAL PERSON IKUTOKU GAKUEN, Atsugi (JP)

( * ) Notice: Subject to any disclaimer, the term of this patent is extended or adjusted under 35 U.S.C. 154(b) by 465 days.

(21) Appl. No.: 16/141,020

(22) Filed: Sep. 25, 2018

(65) Prior Publication Data
US 2019/0106103 A1 Apr. 11, 2019

(30) Foreign Application Priority Data
Oct. 5, 2017 (JP) .............................. JP2017-195282

(51) Int. Cl.
*B60W 30/09* (2012.01)
*B60T 7/12* (2006.01)
(52) U.S. Cl.
CPC ................ *B60W 30/09* (2013.01); *B60T 7/12* (2013.01); *B60W 2520/10* (2013.01); *B60W 2554/00* (2020.02); *B60W 2710/182* (2013.01)
(58) Field of Classification Search
CPC ............. B60W 30/09; B60W 30/0956; B60W 30/0953; B60W 30/095; B60W 2554/00;
(Continued)

(56) References Cited

U.S. PATENT DOCUMENTS

2007/0050130 A1* 3/2007 Grimm ............ G08G 1/096716
701/420
2012/0022759 A1* 1/2012 Inoue ........................ B60T 7/22
701/70
(Continued)

FOREIGN PATENT DOCUMENTS

JP 2009-286279 A 12/2009
JP 2013-171439 A 9/2013
(Continued)

OTHER PUBLICATIONS

Takahiro Hasegawa et al.: "Study on Autonomous Driving Intelligence System by Using Optimal Control Considering Risk Potential", Society of Automotive Engineering of Japan, Inc. Academic Lecture Preprint 20145871, 2014.

*Primary Examiner* — Anshul Sood
(74) *Attorney, Agent, or Firm* — Sughrue Mion, PLLC

(57) ABSTRACT

A driving assistance control device includes an active pedal configured to control a driving and braking force of a vehicle, an electronic control unit configured to detect a potential risk area in which an obstacle entering a scheduled traveling route of the vehicle is likely to be present, and determine a reference speed at which contact between the (Continued)

vehicle and the obstacle can be avoided even when the obstacle enters the scheduled traveling route of the vehicle from the detected potential risk area based on a positional relationship between the vehicle and the potential risk area, and a force feedback unit configured to apply an assistance reaction force in a direction in which the amount of manipulation is reduced, to the active pedal when a current speed of the vehicle exceeds the reference speed.

7 Claims, 10 Drawing Sheets

(58) Field of Classification Search
CPC ....... B60W 2520/10; B60W 2710/182; B60W 2720/10; B60W 2554/801; B60W 50/16; B60T 7/12; B60K 26/021; B60K 31/0008; B60K 31/02; B60K 2026/023
See application file for complete search history.

(56) References Cited

U.S. PATENT DOCUMENTS

| | | |
|---|---|---|
| 2012/0325042 A1 | 12/2012 | Takiguchi et al. |
| 2013/0304317 A1* | 11/2013 | Takiguchi ....... B60W 30/18145 701/36 |
| 2014/0180568 A1* | 6/2014 | Nagata ..................... B60T 7/22 701/301 |
| 2017/0327110 A1 | 11/2017 | Inoue et al. |
| 2017/0361851 A1 | 12/2017 | Takeya et al. |

FOREIGN PATENT DOCUMENTS

| | | | |
|---|---|---|---|
| JP | 2013-196031 A | | 9/2013 |
| JP | 2014-148285 A | | 8/2014 |
| JP | 2015227097 | * | 12/2015 |
| JP | 2016-141232 A | | 8/2016 |
| JP | 2017-047746 A | | 3/2017 |
| JP | 2017-206040 A | | 11/2017 |
| WO | 2011/111489 A1 | | 9/2011 |

* cited by examiner

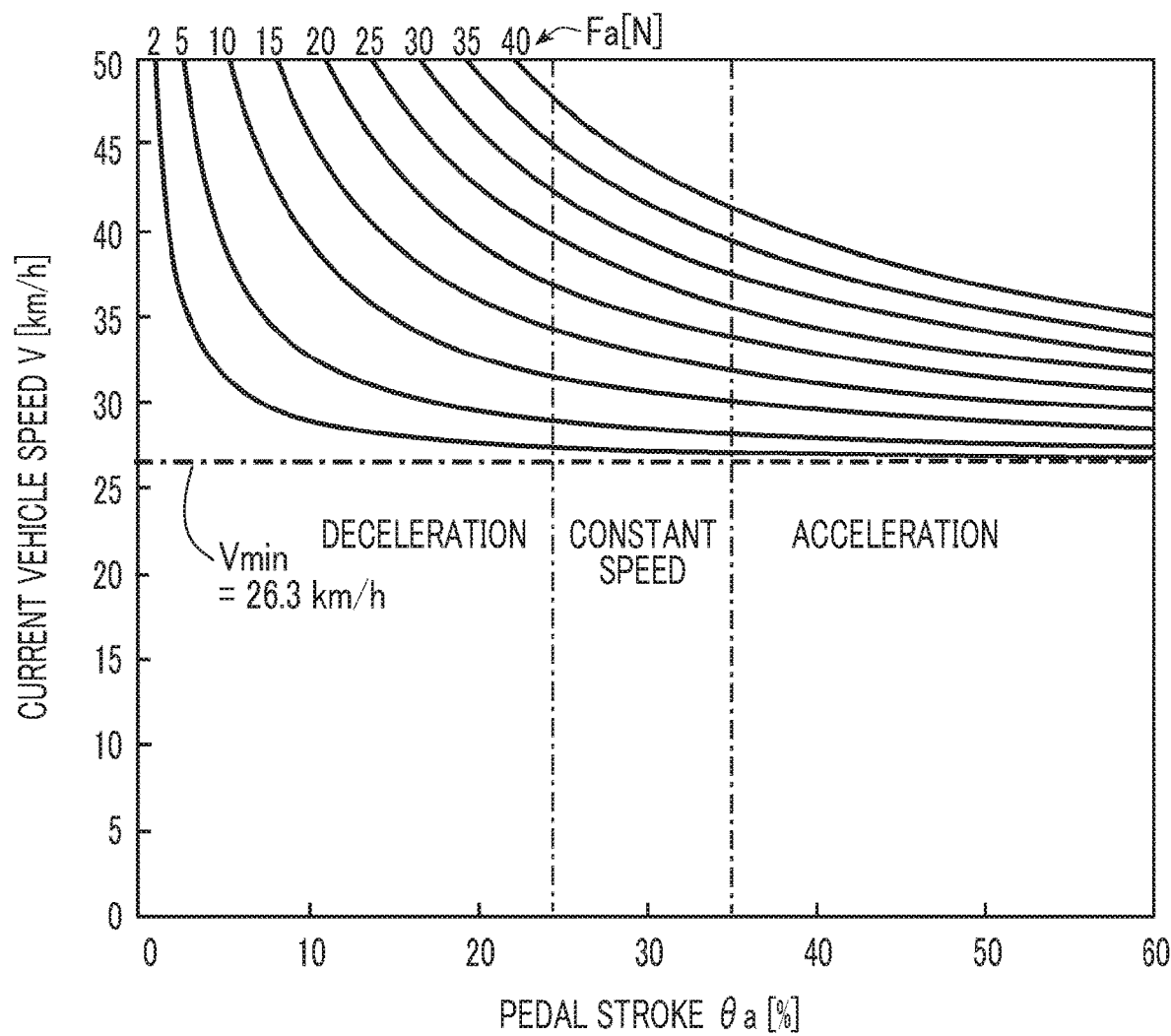

DRIVING ASSISTANCE CONTROL DEVICE

INCORPORATION BY REFERENCE

The disclosure of Japanese Patent Application No. 2017-195282 filed on Oct. 5, 2017 including the specification, drawings and abstract is incorporated herein by reference in its entirety.

BACKGROUND

1. Technical Field

The present disclosure relates to a device for assisting in driving of a vehicle such as a car, and more particularly, to a device that executes driving assistance for achieving avoidance of contact with a pedestrian or a bicycle (an obstacle) that rushes into or enters a scheduled traveling route in front of a vehicle from a blind spot area or an area beside a road, which is a blind spot for a driver such as a shadow of an obstacle beside the road or a building, or reduction in impact at the time of contact during traveling of the vehicle.

2. Description of Related Art

As a vehicle driving assistance system, a configuration for avoiding collision or contact with an obstacle detected in a traveling direction of a traveling vehicle has been proposed in various aspects. For example, Japanese Unexamined Patent Application Publication No. 2009-286279 (JP 2009-286279 A) discloses a configuration in which, when an object is found in front of a traveling vehicle, the amount of lateral movement of a subject vehicle for avoiding the object is set according to a type of the object and a relative speed between the object and a subject vehicle, and traveling control is executed to achieve the set amount of lateral movement. Japanese Unexamined Patent Application Publication No. 2013-171439 (JP 2013-171439 A) proposes performing a decision as to whether or not to perform driving assistance control based on a change in a degree of an approach to an object found in front of a traveling vehicle and a change in amount of physical manipulation through a driving manipulation and making a determination of a method of driving assistance (deceleration and steering). Furthermore, a driving assistance control system called an emergency avoidance braking system (autonomous emergency braking system) has been proposed. In the system as described above, when an obstacle rushing into a traveling road of a traveling vehicle is detected, an alarm prompting a brake manipulation is presented to a driver. When a decision is performed that the driver does not take a countermeasure action, a collision avoidance brake is autonomously executed by the system. For example, in "Study on autonomous driving intelligence system based on optimal control theory considering risk potential", Takahiro Hasegawa and four others, Society of Automotive Engineering of Japan, Inc. Academic Lecture Preprint 20145871, 2014, a system in which, when a blind spot area such as the front of a parked vehicle beside a road during traveling of a vehicle is found, deceleration of the vehicle is executed autonomously, and an emergency avoidance braking system effectively functions when an obstacle actually rushes from the blind spot area so that avoidance of contact with the obstacle or reduction of impact can be achieved has been proposed.

A system capable of both acceleration and deceleration of a vehicle by merely adjusting a pedal stroke of one pedal (one-pedal drive system or one-pedal drive mode) has been proposed as a configuration of a driving assistance system for improving manipulability of a driver, particularly, controllability during braking. In the one-pedal drive system as described above, for example, a driving force and a braking force are generated so that a vehicle is accelerated when a pedal stroke of an accelerator pedal exceeds a predetermined amount and the vehicle is decelerated when the pedal stroke of the accelerator pedal falls below the predetermined amount. Regarding the one-pedal drive system as described above, Japanese Unexamined Patent Application Publication No. 2016-141232 (JP 2016-141232 A) describes a configuration in which a braking force is increased so that deceleration can be performed rapidly when a pedal return speed is higher than a predetermined speed. Japanese Unexamined Patent Application Publication No. 2017-047746 (JP 2017-047746 A) proposes a configuration in which creep torque traveling or generation of a small driving force is permitted even when a pedal stroke of an accelerator pedal falls below a predetermined amount so that a vehicle can be started solely by stepping off of a brake pedal when a vehicle speed is equal to or lower than a predetermined value and a pedal stroke of the brake pedal is equal to or greater than a predetermined value in order to facilitate driving of alternately repeating stopping and low-speed traveling, for example, in a traffic jam.

SUMMARY

Many systems of the related art such as the autonomous emergency braking system (AEB) as described above are configured to detect an obstacle that rushes into a road and execute deceleration when a risk of contact with the subject vehicle becomes obvious. In the case of the configuration as described above, a certain amount of time is needed for the system (machine) to acquire and analyze information on a surrounding environment. Therefore, when an obstacle suddenly rushes from the blind spot area (viewed from the subject vehicle) such as behind a parked vehicle, a shade, or an intersection with poor visibility or when the obstacle traveling beside the road suddenly enters the road, a preferred degree of deceleration may not be achieved. From the above-described content, for example, in a system as described in "Study on autonomous driving intelligence system based on optimal control theory considering risk potential", Takahiro Hasegawa and four others, Society of Automotive Engineering of Japan, Inc. Academic Lecture Preprint 20145871, 2014, a driving situation that is to occur a few seconds later is read in advance at a time when the system has found a blind spot area as described above, "the obstacle may rush" is assumed in advance, and deceleration of a vehicle is executed (deceleration control of the vehicle as described above is executed to simulate a deceleration manipulation by a skilled driver). According to the configuration as described above, even when the obstacle suddenly rushes into a road, a subject vehicle speed can be reduced to a speed range in which an AEB can appropriately operate before the obstacle rushes. Therefore, a control effect of the AEB can be exerted sufficiently or preferably.

As described above, in the case of a control configuration in which deceleration of the vehicle is executed (which is a brake) on the assumption of a risk of an obstacle rushing into a road in front of a vehicle when a blind spot area or an obstacle beside a road is found ("prediction of a potential risk"), a system automatically intervenes in driving of the vehicle based on prediction of the potential risk in a step in which entry of an obstacle into the road is not found, that is, before a risk of contact between the vehicle and the obstacle becomes obvious. However, in reality, when a blind spot area or an obstacle beside the road is found, the obstacle does not always rush into the road, and constant execution of deceleration of the vehicle on the assumption of a worst case scenario for an uncertain case as described above may not match an intention of a driver of the vehicle since the driver may have various motives in driving. For example, when the system (machine) recognizes the blind spot area or the obstacle beside the road and predicts the potential risk, and the driver (human) can apparently determine that the obstacle will not rush, a conflict of intention between the human and the machine occurs. In this case, even though the deceleration operation by the system (machine) is preferable, it is difficult for the driver (human) to understand the control intention, or when a driving intention of the driver is not reflected at all in the control operation of the system, the driver is likely to feel uncomfortable with respect to the control operation of the system. In a situation in which the conflict of intention between the human and the machine as described above can occur, a configuration capable of considering the intention of the driver, that is, sharing a driving authority between the human and the machine, in which a manipulation of the driver can be guided so that intention of preferable deceleration control by the system according to a traveling situation can be achieved as much as possible (a human-machine interface such as a tactile shared control) is preferable. Regarding the above points, in the configuration proposed up to now, overriding by the driver with respect to the deceleration control based on the prediction of the potential risk is permitted on the decelerating side, whereas overriding is not permitted on the acceleration side (which is a design specification that cannot be permitted on the acceleration side). Therefore, it is advantageous to have a novel human-machine interface for solving the above.

Meanwhile, in a configuration in which both acceleration and deceleration of a vehicle can be performed by adjusting the amount of manipulation or a pedal stroke of the one-pedal drive system or one-pedal drive mode as described above, that is, one pedal (hereinafter referred to as "active pedal"), a manipulation target of a driver for vehicle speed adjustment is integrated into the amount of manipulation or a pedal stroke of the "active pedal". In the configuration as described above, when an intervention in driving of the vehicle by the system that executes the deceleration of the vehicle based on the prediction of the potential risk is also performed as one driving assistance through the "active pedal", the manipulation target by the system can also be integrated into the "active pedal. As a result, the driver can easily grasp the intention of intervention in the driving of the vehicle by the system through the "active pedal", the driving authority between the driver and the system can be shared, and a configuration that guides the manipulation of the driver to achieve preferable speed control of the system through a simpler structure. In the present disclosure, driving assistance control based on prediction of the potential risk adopting one-pedal drive system or one-pedal drive mode is proposed.

Thus, the present disclosure provides a configuration in which a driving authority can be shared between a driving assistance control device (system) intending to decelerate a vehicle based on "prediction of the potential risk" during traveling of the vehicle and a driver.

The present disclosure further provides a configuration in which a driving assistance control device and a driver can intervene in driving of a vehicle through an "active pedal" by adopting a configuration of a one-pedal drive system or a one-pedal drive mode, and driving of the vehicle or a manipulation of the driver is guided so that a preferable speed control intention of the driving assistance control device is realized as much as possible.

An aspect of the disclosure relates to a driving assistance control device. The driving assistance control device includes: an active pedal configured to control a driving force and a braking force of a vehicle such that the vehicle is accelerated when an amount of manipulation exceeds a first predetermined value and the vehicle is decelerated when the amount of manipulation falls below a second predetermined value equal to or smaller than the first predetermined value; an electronic control unit configured to detect a potential risk area, the potential risk area being an area in which an obstacle entering a scheduled traveling route of the vehicle in a traveling direction of the vehicle is likely to be present, and determine a reference speed based on a positional relationship between the vehicle and the potential risk area, the reference speed being a speed of the vehicle at which contact between the vehicle and the obstacle is avoided even when the obstacle enters the scheduled traveling route of the vehicle from the potential risk area when the potential risk area is detected; and a force feedback unit configured to apply an assistance reaction force to the active pedal when a current speed of the vehicle exceeds the reference speed, the assistance reaction force being a force in a direction in which the amount of manipulation is reduced.

In the above configuration, the "active pedal" is a pedal that is manipulated by the driver for acceleration and deceleration of the vehicle in the so-called one-pedal drive system or one-pedal drive mode as described above. As described above, the active pedal may be configured to control a driving force and a braking force of the vehicle such that the vehicle is accelerated when the amount of manipulation exceeds the first predetermined value and the vehicle is decelerated when the amount of manipulation is below the second predetermined value equal to or smaller than the first predetermined value. Here, the "first predetermined value" and the "second predetermined value" with respect to the amount of manipulation may be optionally set, the first predetermined value and the second predetermined value are the same value, or the first predetermined value and the second predetermined value may be at an interval with any width. The active pedal may be configured such that the amount of manipulation of the active pedal is increased from the first predetermined value, the acceleration of the vehicle is increased, and the acceleration of the vehicle is maximized when the amount of manipulation is maximized, and the amount of manipulation is decreased from the second predetermined value, the deceleration of the vehicle is increased, and the deceleration of the vehicle is maximized when the amount of manipulation is minimized (when the amount of manipulation of the active pedal is the first predetermined value and the second predetermined value, the acceleration and deceleration acting on the vehicle may become substantially 0 and the vehicle may enter a constant speed traveling state). The active pedal is normally depressed by a foot of the driver. In this case, the amount of manipulation is the pedal stroke of the pedal, but an aspect of the present disclosure is not limited thereto. For example, the active pedal may have a shape such as a control stick that is manipulated with a hand of the driver, and the case as described above also falls within the scope of the present disclosure. In the vehicle, apart from the active pedal, a brake pedal for increasing the braking force when the amount of manipulation or the pedal stroke increases may be provided such that sudden braking can be achieved by rapidly manipulating or stepping on the brake pedal.

Further, in the above configuration, the "potential risk area" is an area in which an obstacle entering the scheduled traveling route of the vehicle in the traveling direction of the vehicle is likely to be as described above. Specifically, the potential risk area is an area ("blind spot area") that is a blind spot as viewed from the driver of a vehicle or an environment recognition unit of a camera or a radar device mounted on a vehicle, such as the front of a parked vehicle or an obstacle beside the road in the traveling direction of the subject vehicle, or a shadow of a building or a wall, an area beside the road in which there is an obstacle, an area beside the road in which a crosswalk is present in the road, or the like, as described above. In this case, the "electronic control unit" may be any means capable of detecting a situation around the vehicle, such as an in-vehicle camera or a radar device, or means for detecting or recognizing the area that is the "blind spot area", an obstacle beside the road, a crosswalk, and the like from the information on a vehicle surroundings obtained by a global positioning system (GPS) device or the like. Here, the "reference speed" is a speed of the vehicle set such that contact between the vehicle and the obstacle rushing out of the potential risk area can be avoided as described above, and is determined using a positional relationship between the vehicle and the potential risk area (a distance in a front-rear direction and a distance in a lateral direction between the vehicle and the potential risk area), as described in detail in a column of embodiments to be described below. In the embodiment, in short, the "reference speed" may be a speed of the vehicle at which contact between the vehicle and the obstacle can be avoided by "emergency avoidance braking", that is, a braking process operated when a risk of contact between the subject vehicle and the obstacle becomes obvious due to rushing of the obstacle (a pedestrian or a bicycle) into the scheduled traveling route of the vehicle, that is, in front of the vehicle even when the obstacle enters the scheduled traveling route of the vehicle from the potential risk area. Specifically, in an embodiment, the "reference speed" may be a speed at which the vehicle can stop before reaching the front of the potential risk area in a case in which the "emergency avoidance braking" is started from the speed when the risk of contact between the subject vehicle and the obstacle becomes obvious due to the obstacle rushing into the scheduled traveling route of the vehicle when the vehicle is at a certain position before the potential risk area. The "force feedback unit" is means configured to apply a force to the active pedal, and the "assistance reaction force" to be applied is a force in a direction in which the amount of manipulation of the active pedal is reduced, as described above, and is applied when a current speed of the vehicle exceeds the reference speed. That is, the "force feedback unit" is means for performing tactile feedback to the driver.

According to the aspect of the present disclosure, further, basically, acceleration and deceleration control or speed control of a traveling vehicle is performed by the driver adjusting manipulation or depression of the active pedal. When the "potential risk area" is detected during traveling of the vehicle, a potential risk of an obstacle rushing out of the potential risk area is predicted. As described above, calculation of the reference speed is executed, and when the current speed of the vehicle is higher than the reference speed, an assistance reaction force is applied to the active pedal. Then, the active pedal receives a force in a direction in which the amount of manipulation is reduced or in a direction in which the active pedal is stepped back. A position of the active pedal is guided in a direction in which the vehicle speed is decelerated as described above due to an increase in the braking force acting on the vehicle until the current speed falls below the reference speed. In this case, in a state in which the active pedal is being manipulated with a foot or hand of the driver, the driver can recognize in a tactile manner that the current vehicle speed exceeds the reference speed due to the above assistance reaction force acting on the active pedal, and control intention of deceleration of the driving assistance control device (machine). Further, since the driver receives a force in a direction in which the amount of manipulation of the active pedal is reduced, it is difficult to increase the amount of manipulation of the active pedal, thereby preventing the vehicle speed from being easily accelerated. Further, in a case where the driver executes an override intending constant-speed traveling or accelerated traveling regardless of a control intention of deceleration of the driving assistance control device, the driver can reflect his or her intention in the driving of the vehicle by manipulating or depressing the active pedal with a force beyond the assistance reaction force. Thus, according to the device of the present disclosure, a configuration capable of pre-reading a driving situation after a few seconds in which "the obstacle may rush", transmitting a control intention of a device to decelerate the vehicle speed to the reference speed to the driver, and guiding driving of the vehicle in a direction intended by device control, at the time of finding the potential risk area while ensuring a configuration in which overriding for the control of the driving assistance control device can be performed, that is, a configuration in which the driving authority between the device and the driver can be shared is provided.

In an aspect of the present disclosure, the assistance reaction force applied to the active pedal by the force feedback unit may be increased as a difference by which the current speed of the vehicle exceeds the reference speed is greater. According to the configuration as described above, when the current vehicle speed is higher than the reference speed, the assistance reaction force for displacement or guidance in a direction in which the amount of manipulation of the active pedal is reduced is increased, and a higher degree of deceleration of the vehicle is easily executed due to a greater braking force. That is, when a current traveling state of the vehicle is further away from a motion state of the vehicle intended by the driving assistance control device, an action for guidance to control intention of the driving assistance control device becomes greater, and accordingly, the traveling state of the vehicle can be rapidly guided to a preferable state intended by the driving assistance control device. In an aspect of the above configuration, a "potential risk index value" defined as $V/V_{min}-1$ is calculated using the current speed $V$ and the reference speed $V_{min}$, and when the potential risk index value is equal to or greater than 0 and is equal to or smaller than 1 and the potential risk index value is greater (that is, when a ratio of a difference between the current speed $V$ and the reference speed $V_{min}$ to the reference speed $V_{min}$ is higher), the assistance reaction force may be increased. Accordingly, an extreme increase in the assistance reaction force is avoided.

In the configuration of the device according to the present disclosure, as the amount of manipulation of the active pedal is larger, the assistance reaction force to be applied to the active pedal by the force feedback unit may be increased. The acceleration and deceleration of the vehicle is shifted to the acceleration side as the amount of manipulation of the active pedal is larger. On the other hand, in a situation in which an assistance reaction force is applied, the driving assistance control device intends to decelerate the vehicle. Accordingly, as the amount of manipulation of the active pedal is larger, that is, when the acceleration and deceleration of the vehicle is shifted to the acceleration side, the amount of manipulation of the active pedal can be guided so that the acceleration and deceleration of the vehicle is shifted to the deceleration side as soon as possible by increasing the assistance reaction force.

In the configuration of the device according to the present disclosure, since the reference speed, more specifically, differs according to a distance in a lateral direction between the vehicle and the potential risk area, the electronic control unit may be configured to determine the reference speed based on the distance in the lateral direction between the vehicle and the blind spot area. A specific example of a method of determining the reference speed will be described below.

Incidentally, when the vehicle passes in front of the potential risk area without the obstacle entering the scheduled traveling route of the vehicle from the found potential risk area, the deceleration of the vehicle based on the prediction of the potential risk is not needed, and therefore, the potential risk index value may be set to 0 and the application of the assistance reaction force may be stopped. However, when the application of the assistance reaction force is stopped before the vehicle speed falls below the reference speed, a sudden change in the force acting on the active pedal can occur. In a case where the assistance reaction force applied by the force feedback unit is determined based on the potential risk index value to avoid a sudden change in the force, the assistance reaction force is determined to be a value proportional to a first order lag value of the potential risk index value, and accordingly, the change in the force acting on the active pedal may become gentle.

Thus, in the device of the present disclosure, the configuration in which both acceleration and deceleration of the vehicle can be performed by the driver of the vehicle adjusting the amount of manipulation of one active pedal (a one-pedal drive system or a one-pedal drive mode) is adopted, and in the driving assistance control based on the prediction of the potential risk of an obstacle rushing out of the potential risk area in a step in which the potential risk area is found, the intention of deceleration in pre-reading driving based on the prediction of the potential risk is reflected in the driving of the vehicle through the application of the assistance reaction force to the active pedal. According to the configuration as described above, the driving of the vehicle or the manipulation of the driver is guided so that the control intention of the pre-reading driving in which the driving assistance control device intends to decelerate is achieved due to the application of the assistance reaction force to the active pedal, whereas the driver is likely to reflect the driving intention of the driver beyond the control intention of the driving assistance control device through manipulation or depression of the active pedal exceeding the assistance reaction force, and thus, a new human-machine interface configuration that realizes haptic shared control in which the driving authority between the driving assistance control device and the driver can be shared is provided.

Other objects and advantages of the present disclosure will become apparent from the following description of preferred embodiments of the present disclosure.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a diagram illustrating, in the form of a graph, a magnitude (a numerical value) of an assistance reaction force Fa to be applied to the active pedal, which is determined using a pedal stroke (a horizontal axis) of the active pedal and a current vehicle speed V (a vertical axis) when a certain reference speed Vmin (=26.3 km/h) is calculated;

DETAILED DESCRIPTION OF EMBODIMENTS

Configuration of Vehicle

Figure 1A:
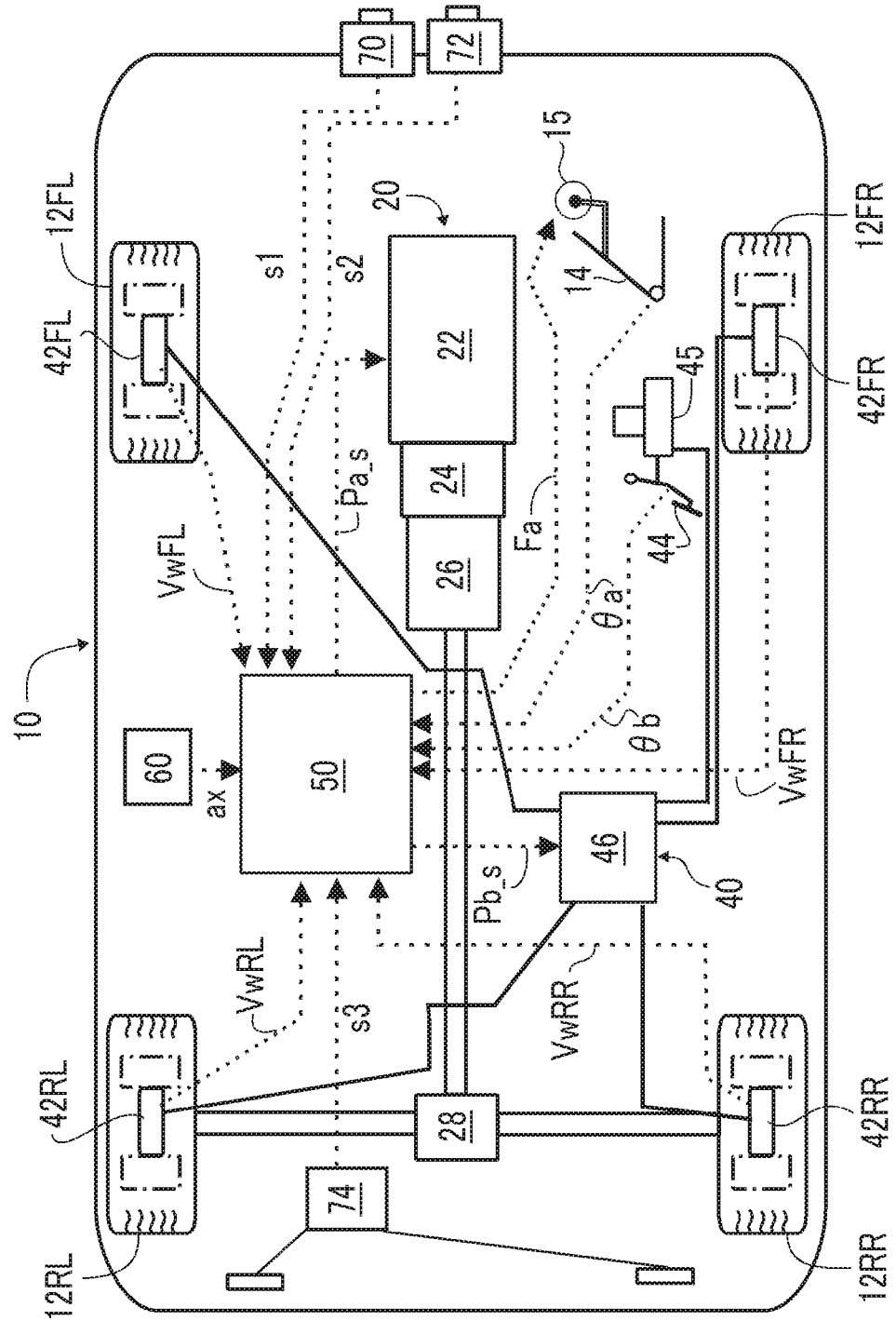
FIG. 1A is a schematic diagram of a vehicle on which a preferred embodiment of a driving assistance control device according to the present disclosure is mounted.

Referring to FIG. 1A, in a vehicle 10 such as a car in which a preferred embodiment of a driving assistance control device of the present disclosure is incorporated, right and left front wheels 12FR, 12FL, right and left rear wheels 12RR, 12RL, a driving device 20 that generates a braking and driving force for each wheel (in the illustrated example, solely a rear wheel since a vehicle is a rear wheel driven vehicle in the illustrated example), a steering device (not illustrated) for controlling a steering angle of vehicle wheels, and a brake device 40 that generates a braking force for each wheel are mounted in a normal aspect. The driving device 20 is configured such that a driving torque or a rotational force is transmitted from an engine and/or an electric motor 22 (which may be a hybrid driving device including both the engine and the electric motor) to rear wheels 12RL, 12RR via a torque converter 24, a transmission 26, a differential gear device 28, and the like in a normal aspect. A power steering device that transmits rotation of a steering wheel (not illustrated) operated by the driver to a tie rod (not illustrated) and steers front wheels 12FL, 12FR while the power steering device multiplies a rotation torque of the steering wheel may be adopted in the steering device. The brake device 40 is an electronically controlled hydraulic brake device of a type in which brake pressure in a wheel cylinder 42i (i=FL, FR, RL, and RR) mounted on each wheel, that is, the braking force in each wheel is adjusted by a hydraulic circuit 46 communicating with a master cylinder 45 operated in response to depression of a brake pedal 44 by the driver. Various valves (a master cylinder cut valve, a hydraulic pressure holding valve, or a pressure reducing valve) that cause a wheel cylinder of each wheel to selectively communicate with the master cylinder, an oil pump, or an oil reservoir (not illustrated) in a normal aspect are provided in the hydraulic circuit 46. In a normal operation, pressure of the master cylinder 45 is supplied to the respective wheel cylinders 42i in response to depression of the brake pedal 44. The brake device 40 may be a type of brake device that pneumatically or electromagnetically applies a braking force to each wheel or any other type of brake device for those skilled in the art.

In the vehicle 10 in which the driving assistance control device according to the present embodiment is mounted, a one-pedal drive system, that is, a configuration in which in which adjustment of acceleration and deceleration of the vehicle can be achieved according to a manipulation or depression of one pedal (an active pedal) by the driver is adopted. In the one-pedal drive system as described above, an active pedal 14 is provided in place of an accelerator pedal for adjusting an operation of a driving device of normal vehicle. As will described in detail later, the driving device 20 and/or the brake device 40 is operated to generate a braking and driving force based on a command of the electronic control device 50 so that the vehicle is accelerated with the acceleration corresponding to the amount of manipulation or the pedal stroke of the active pedal 14 when the amount of manipulation or the pedal stroke of the active pedal 14 exceeds the first predetermined value and so that the vehicle is decelerates with the deceleration corresponding to the amount of manipulation or the pedal stroke of the active pedal 14 when the amount of manipulation or the pedal stroke of the active pedal 14 falls below a second predetermined value equal to or smaller than the first predetermined value (when the acceleration and deceleration of the vehicle is increased to the acceleration side, the driving device 20 is operated to generate driving force, and when the acceleration and deceleration of the vehicle is decreased to the deceleration side, the various valves are operated and the braking pressure in the wheel cylinder of each wheel is increased in the hydraulic circuit 46 of the brake device 40 to generate the brake force). The brake pressure in the wheel cylinder of each wheel may also be increased due to depression of the brake pedal 44. In the vehicle according to the present embodiment, switching between a drive mode in which the active pedal 14 is used as a normal accelerator pedal, that is, a mode in which an operation of the driving device 20 is controlled according to the amount of manipulation or a pedal stroke of the accelerator pedal and the one-pedal drive mode, that is, a mode in which the one-pedal drive system for operating the driving device 20 or the brake device 40 is realized according to the amount of manipulation or the pedal stroke of the active pedal 14 may be performed according to the selection of the driver or a traveling state.

Furthermore, an assistance reaction force generator 15 for applying a force (an assistance reaction force) in a direction in which the amount of manipulation or the pedal stroke of the active pedal is reduced is included in the active pedal 14. The assistance reaction force generator 15 is configured to be able to apply an assistance reaction force to the active pedal 14 based on a command from the electronic control device 50 when the potential risk area is found ahead in the traveling direction of the vehicle and deceleration based on prediction of the potential risk is intended by the driving assistance control device, as will be described in detail later.

Furthermore, in the vehicle 10 to which the preferred embodiment of the driving assistance control device of the present disclosure is applied, an in-vehicle camera 70, the radar device 72, and the like that detect a situation around the vehicle and detect other vehicles around the vehicle, and an obstacle as a target, such as a moving obstacle (hereinafter referred to as an "obstacle") such as a pedestrian, a wheelchair, a bicycle, and an animal, a road width, a building, or a wall, may be provided, and a GPS device (car navigation system) 74 that communicates with a GPS satellite and acquires various pieces of information such as a surrounding situation or position information of the subject vehicle may be provided.

Operation control of each unit of the vehicle and operation control of the driving assistance control device according to the present disclosure are executed by the electronic control device 50 (a computer). The electronic control device 50 may include a microcomputer including a central processing unit (CPU), a read only memory (ROM), a random access memory (RAM), and an input/output port device which are connected to each other by a normal type of bidirectional common bus, and a driving circuit. A configuration and operation of each unit of the driving assistance control device of the present disclosure, which will be described below, may be realized by the operation of the electronic control device 50 according to a program. Detection values from the various sensors to be used as parameters for driving assistance control of the present disclosure, which is executed in an aspect to be described below, such as information s1 to s3 from the in-vehicle camera 70, the radar device 72, the GPS device 74, and the like, the amount of manipulation or the pedal stroke θa of the active pedal 14, the pedal stroke θb of the brake pedal, a wheel speed Vwi (i=FL, FR, RL, and RR), and front and rear actual acceleration and deceleration ax (from front and rear G sensors), are input to the electronic control device 50. A control command Pa_s to the driving device 20 for generating a driving force for accelerating the vehicle, a control command Pb_s to the brake device 40 for generating a braking force for decelerating the vehicle, a control command Fa to the assistance reaction force generator 15 for generating the assistance reaction force for the active pedal 14, and the like are output to the corresponding devices. Although not illustrated, various parameters needed for various controls to be executed in the vehicle of the present embodiment, for example, various detection signals such as a steering angle, a yaw rate, and a lateral acceleration are input, and various control commands may be output to the corresponding devices.

Configuration of Device

Figure 1B:
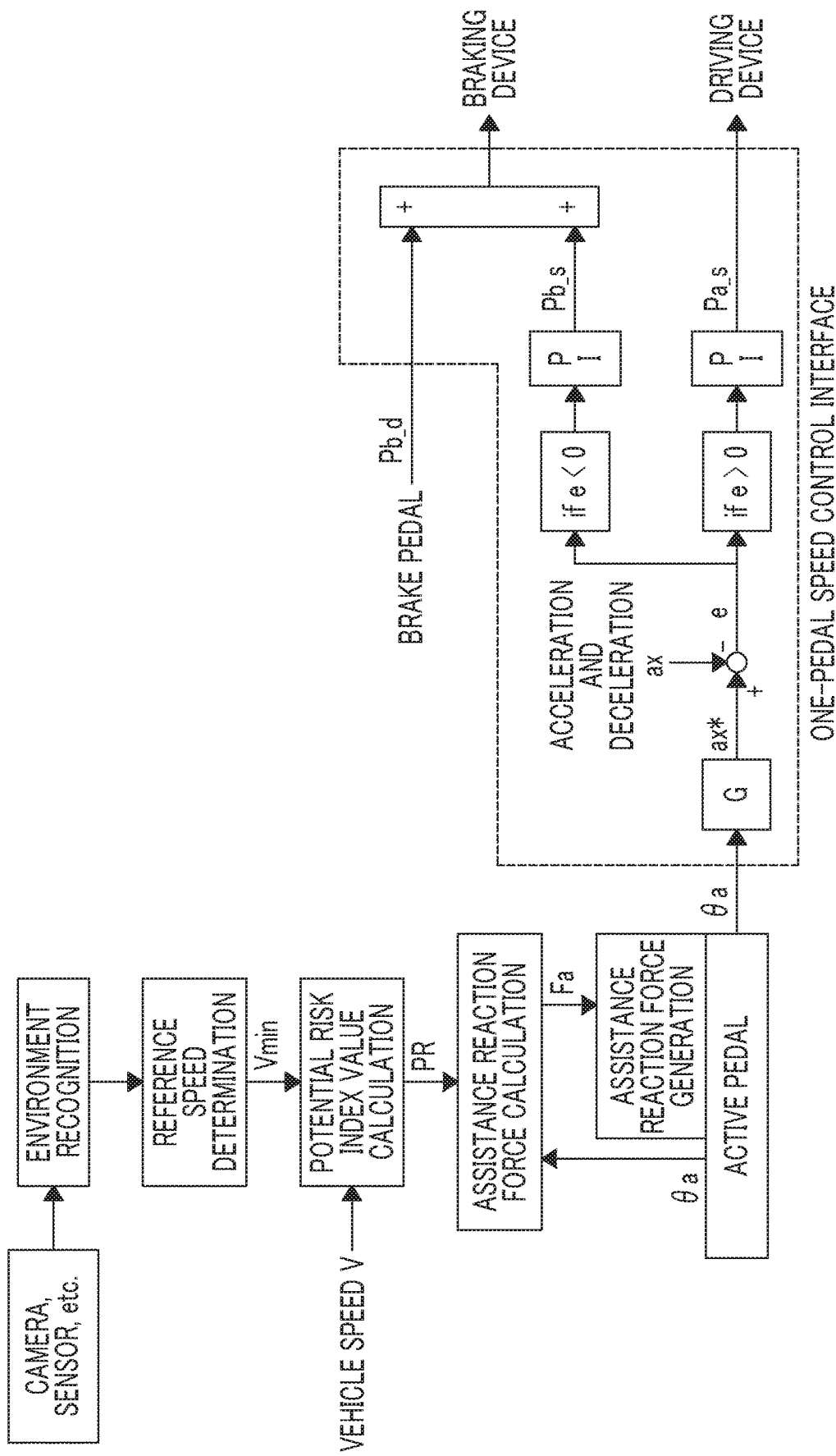
FIG. 1B is a block diagram illustrating a configuration of a system in an embodiment of the driving assistance control device according to the present disclosure.

Referring to FIG. 1B, the driving assistance control device according to the present embodiment specifically includes an environment recognition unit, a reference speed determination unit, a potential risk index value calculation unit, an assistance reaction force calculation unit, an active pedal, an assistance reaction force generator, and a one pedal speed control interface unit. Briefly, in the environment recognition unit, recognition of a situation around the vehicle is executed based on information of a camera, a sensor, and the like. When presence of the potential risk area (a blind spot area viewed from the vehicle, an area beside the road in which there is an obstacle, an area beside the road of a crosswalk, or the like) is detected, the reference speed determination unit determines the reference speed Vmin, that is, a speed of the vehicle set so that contact between the vehicle and the obstacle rushing out from the potential risk area can be avoided based on the positional relationship between the potential risk area and the vehicle. The potential risk index value calculation unit calculates a potential risk index value PR using the reference speed Vmin and the current vehicle speed V (may be determined using any scheme from a wheel speed value). The assistance reaction force calculation unit calculates an assistance reaction force Fa to be applied to the active pedal using the potential risk index value PR and the amount of manipulation or the pedal stroke θa of the active pedal in an aspect to be described below, and the assistance reaction force Fa is calculated by the assistance reaction force generator. The amount of manipulation of the active pedal or the pedal stroke θa is sent to the one pedal speed control interface unit, in which control instructions Pa_s and Pb_s for operating the driving device or the brake device are determined according to θa and are transmitted to corresponding devices, respectively.

Operation of Device (1) One-Pedal Drive System

In the vehicle on which the driving assistance control device according to the present embodiment is mounted, a system in which adjustment of acceleration and deceleration of the vehicle is executed through manipulation or depression of the one-pedal drive system, that is, one active pedal is realized by the one pedal speed control interface unit as described above. As described above, in the vehicle of the present embodiment, a pedal used as the accelerator pedal is normally used as the active pedal, and a mode for realizing the one-pedal drive system (one-pedal drive mode) may be selectively executed according to selection of the driver or according to a traveling situation of the vehicle.

Figure 2:
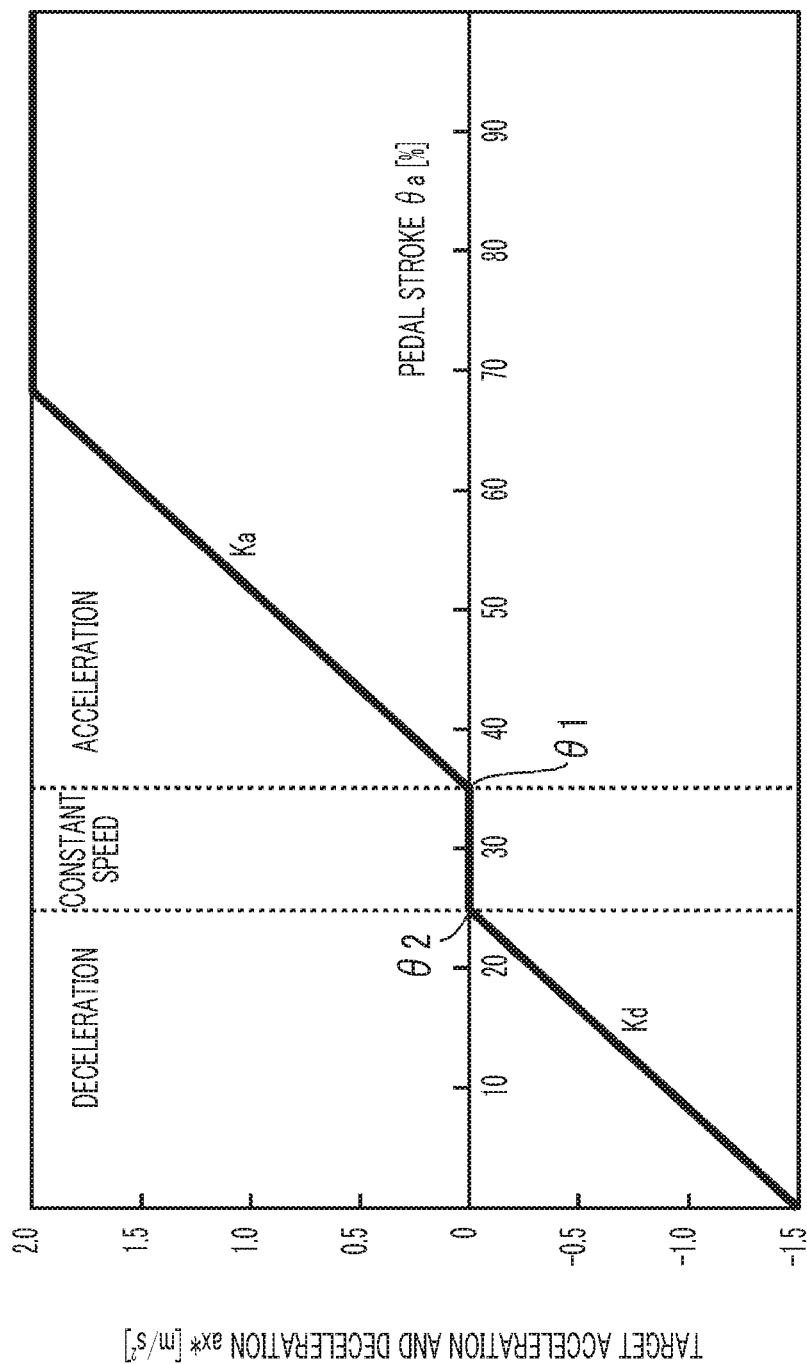
FIG. 2 is a diagram illustrating, in the form of a graph, a value of a target acceleration and deceleration ax* with respect to a pedal stroke θa of an active pedal in a one-pedal drive system that is adopted in a vehicle on which the driving assistance control device of the present embodiment is mounted.

Referring to FIG. 1B, in the one-pedal drive system as described above, more specifically, when the driver performs manipulation or depression of the active pedal, the amount of manipulation or the pedal stroke θa of the active pedal is given to a transfer function unit G. In the transfer function unit G, the amount of manipulation or the pedal stroke θa is converted into a target acceleration and deceleration ax*, as illustrated in FIG. 2. In the conversion into the target acceleration and deceleration ax* in the transfer function unit G, the target acceleration and deceleration ax* may be given as follows according to a magnitude relationship between the amount of manipulation or the pedal stroke θa and the predetermined values θ1 and θ2 (≤θ1), as shown in the drawing.

(i) When θa≥predetermined value θ1, $ax^*=Ka(θa-θ1)≥0$ (Ka is a positive coefficient)

(ii) When the predetermined value θ2≤θa≤θ1 is satisfied, $ax^*=0$ (iii) When θa≤predetermined value θ2 (≤θ1)

$ax^*=Kd(θa-θ2)≤0$ (Kd is a positive coefficient)

Therefore, in the case of (i), since ax*≥0, the vehicle is accelerated. In the case of (ii), the vehicle travels at a constant speed. In the case of (iii), since ax*≤0, the vehicle is decelerated. It should be understood that the predetermined values θ1 and θ2 may be appropriately set. In the example of FIG. 2, although θ1>θ2 is set, θ1=θ2 may be set (in this case, constant speed traveling is performed solely when θa=θ1).

When the target acceleration and deceleration ax* is determined as described above, a difference e (=ax*−ax) between the target acceleration and deceleration ax* and the actual acceleration and deceleration ax detected by the front and rear G sensors or the like is calculated, and a control command is given to the driving device 20 and the brake device 40 through a PI controller to increase the driving force and the braking force according to a positive or negative sign of the difference e. Specifically, when the difference e>0, $Pa\_s=ka1·e+ka2\int edt$ is applied as the control command Pa_s to the driving device 20, and an output of the driving device 20 is increased. When the difference e<0, $Pb\_s=kb1·e+kb2\int edt$ is applied as the control command Pb_s to the brake device 40, and the braking force in each wheel is increased. The braking force of the brake device 40 may be increased according to the control command Pb_d corresponding to the pedal stroke θb of the brake pedal.

As another aspect of the one-pedal drive system, when the target acceleration and deceleration ax*>0, the driving force output by the driving device may be adjusted so that the actual acceleration and deceleration ax=the target acceleration and deceleration ax*, and when the target acceleration and deceleration ax*<0, the braking force output by the brake device may be adjusted. In a case where the driving device is an electric motor or a hybrid type driving device capable of executing regenerative braking, when the target acceleration and deceleration ax*<0, a braking force may be generated through regenerative braking of the driving device (in this case, there may be no configuration in which a control command from the target acceleration and deceleration ax*is given to the brake device).

(2) Overview of Driving Assistance

In an operation of the driving assistance control device of the present embodiment, briefly, when a corner of a wall or a building (FIG. 3A), a parked vehicle (FIG. 3B), or a bent road (FIG. 3C) beside the road is detected and the presence of the blind spot area behind the detected object (ahead when viewed from the vehicle) is recognized during traveling of the vehicle (subject vehicle), or when an obstacle is detected beside the road or a crosswalk is detected ahead in the traveling direction (FIG. 3D), as schematically illustrated in FIGS. 3A to 3D, a blind spot area, an area beside the road in which there is an obstacle, or an area beside the road in which there is a crosswalk is recognized as an area (potential risk area) having a potential risk of an obstacle entering the scheduled traveling route (α) of the vehicle from such an area. The presence of the corner of the wall or the building beside the road, the parked vehicle, the obstacle, the bent road, and the position viewed from the vehicle may be detected in any aspect using the in-vehicle camera, the radar device, the GPS device, or the like, as described above, and the position and range of the blind spot area and other potential risk areas may be recognized and specified in any aspect based on the detection information described above. When the potential risk area as described above is specified, driving assistance for decelerating the current vehicle speed to the reference speed is executed when the current vehicle speed is higher than a speed (reference speed) set such that contact with the obstacle can be avoided due to emergency avoidance braking (AEB) even when the obstacle enters the scheduled traveling route of the vehicle, in preparation for a potential risk of an obstacle rushing out of the potential risk area.

Regarding the driving assistance as described above, since the driver of the vehicle can have various motives in driving as described in SUMMARY, the driver is likely to feel uncomfortable from a control operation for driving assistance when the intention of the driver cannot be reflected at all in the driving of the vehicle. In the driving assistance of the present embodiment, when the potential risk area is found, a force (assistance reaction force) acting in a direction in which the amount of manipulation or the pedal stroke of the active pedal is decreased, that is, a direction in which the vehicle is decelerated is applied to the active pedal for adjusting the acceleration and deceleration of the vehicle, and accordingly, guidance of the driving of the vehicle is executed so that the current vehicle speed is decelerated to the reference speed. According to the configuration as described above, the driver can grasp that the driving assistance control device determines that a current driving situation is a situation in which the vehicle should be decelerated in preparation for the potential risk, through the action of the assistance reaction force of the active pedal, and a driving authority can be shared between the device and the driver. That is, when the driver tries to decelerate the vehicle according to the control intention of the driving assistance control device, the amount of manipulation or the pedal stroke of the active pedal may be decreased according to the assistance reaction force of the active pedal. On the other hand, when the driver intends driving different from the control intention of the driving assistance control device, overriding for the driving assistance can also be performed by applying a force beyond the assistance reaction force to the active pedal.

Regarding the assistance reaction force to be applied to the active pedal, more specifically, as the difference (V−Vmin) with which the current vehicle speed V exceeds the reference speed Vmin increases, the assistance reaction force may increase. Accordingly, the driver can grasp an extent to which the current vehicle speed V exceeds the reference speed Vmin through the magnitude of the assistance reaction force. The assistance reaction force may increase as the amount of manipulation or the pedal stroke of the active pedal increases. Accordingly, the driver can recognize how much the current amount of manipulation or pedal stroke of active pedal, that is, the current target acceleration and deceleration is to be displaced in order to set the current vehicle speed to the reference speed, through the magnitude of the assistance reaction force. That is, the configuration in which the assistance reaction force is applied to the active pedal according to a difference between the current vehicle speed and the reference speed, and the amount of manipulation or the pedal stroke of the active pedal constitutes a tactile force feedback unit for feeding a state of travel control back to the driver with a tactile force. Hereinafter, the process of determining the reference speed and the process of determining the assistance reaction force will be described.

(3) Determination of Reference Speed

Figure 4A:
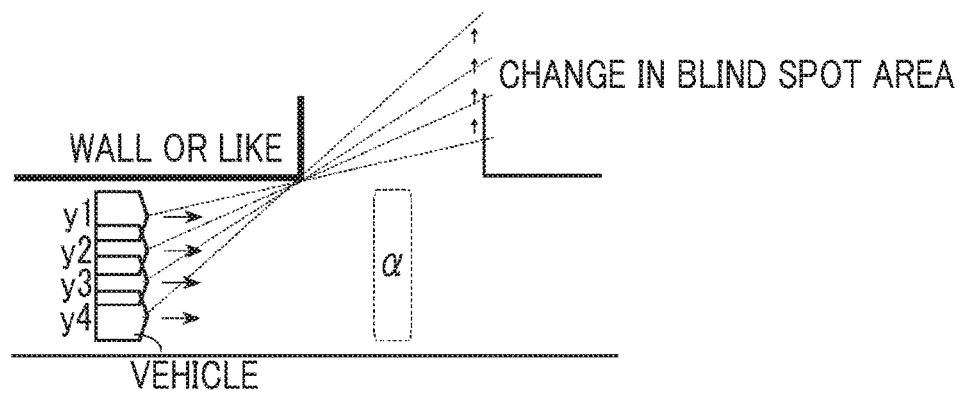
FIG. 4A is a diagram schematically illustrating that when a distance in a lateral direction (a lateral distance) between a vehicle and the side of a road (an edge of a blind spot area) is longer, a range of the blind spot area (a potential risk area) in which the field of view is blocked by a wall or the like is decreased.
Figure 4B:
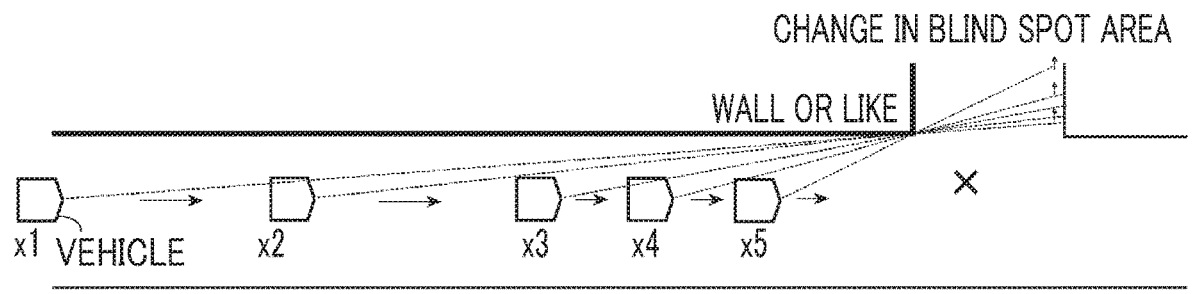
FIG. 4B is a diagram schematically illustrating that when a distance of the vehicle to a road area that an obstacle can enter is shorter, a range of the blind spot area (a potential risk area) in which the field of view is blocked by a wall or the like is decreased.

The reference speed referred to in determining the assistance reaction force to be applied to the active pedal is a speed of the vehicle at which contact with the vehicle and the obstacle can be avoided even when the obstacle enters the scheduled traveling route of the vehicle from the potential risk area, as described above. Thus, in an embodiment, the reference speed may be a target vehicle speed when the vehicle passes through a certain position in front of the virtual contact position so that contact between the vehicle and the obstacle can be avoided due to the vehicle stopped by executing emergency avoidance braking in response to entry of the obstacle to the front of a position (virtual contact position) at which the vehicle comes into contact with the obstacle in a case where it is assumed that the obstacle has entered the scheduled traveling route of the vehicle from the potential risk area when the vehicle is in the certain position. Regarding the reference speed as described above, in a case where the potential risk area is a blind spot area formed by a wall, a parked vehicle, a fence, or the like (a wall or the like) blocking a field of view when viewed from the vehicle (FIGS. 3A to 3C), a boundary of the potential risk area (blind spot area) is also changed according to the change in the field of view blocked by the wall or the like due to the distances (lateral distances) y1 to y4 from the wall or the like of the traveling vehicle and a time when the obstacle rushing out of the potential risk area reaches the scheduled traveling route is changed, as schematically drawn in FIG. 4A, and therefore, the reference speed may be determined to depend on the lateral distance. Similarly, as schematically illustrated in FIG. 4B, a time until the vehicle reaches the virtual contact position (x) is changed according to positions (remaining distances) (x1 to x5) of the vehicle from the potential risk area, a boundary of the potential risk area (blind spot area) is changed according to the change in the field of view blocked by the wall or the like, and a time when the obstacle rushing out of the potential risk area reaches the scheduled traveling route is also changed. Thus, the reference speed may be determined to depend on the remaining distance as described above.

Figure 5:
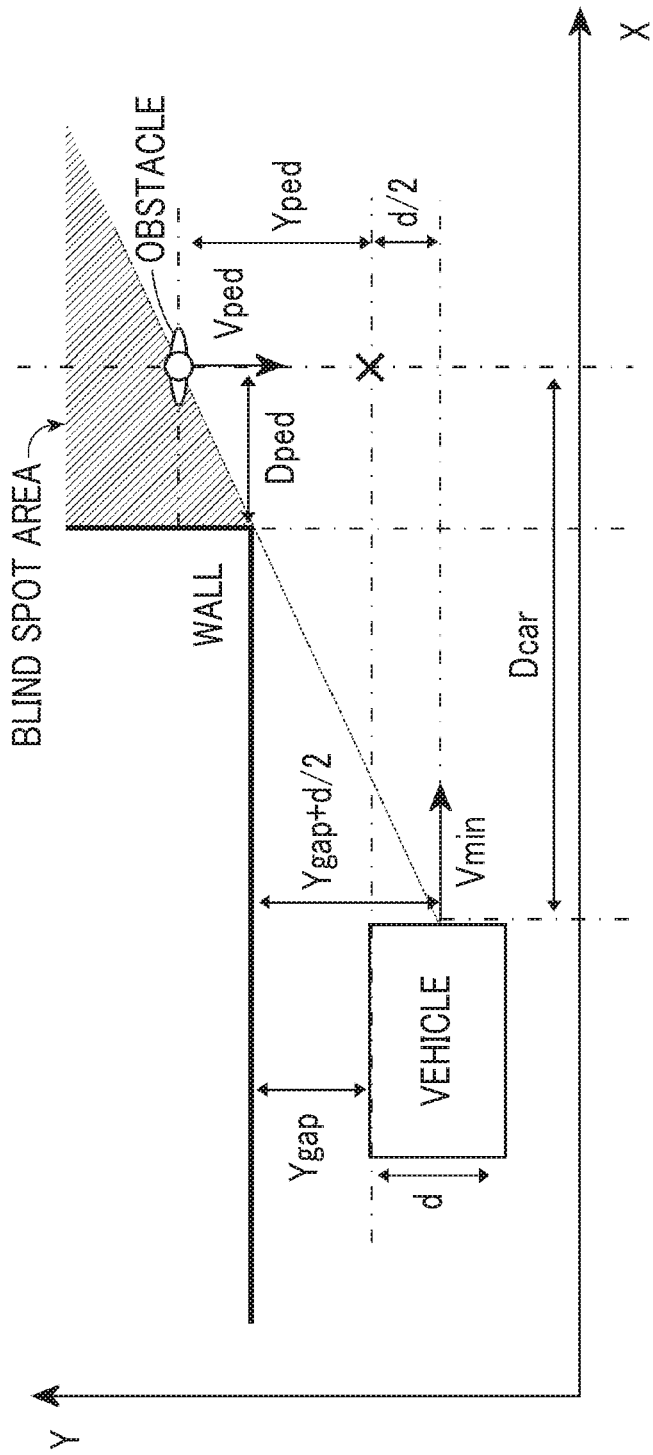
FIG. 5 is a diagram schematically illustrating a state in which a vehicle approaches a potential risk area (blind spot area), and is a diagram illustrating a definition of parameters for calculating a reference speed (a target speed of a vehicle for avoiding contact between the vehicle and an obstacle) when a potential risk area is found.

In an embodiment, the reference speed may be determined based on, for example, the following model. Referring to FIG. 5, it is first assumed that a blind spot area is formed by a wall or the like ahead in the traveling direction (a direction indicated by an arrow) of the vehicle traveling at the speed Vmin, and the obstacle enters at a speed Vped into the scheduled traveling route of the vehicle from a boundary of the blind spot area, as illustrated in FIG. 5. Then, a time when the obstacle reaches the virtual contact position x is Yped/Vped and a time when the vehicle reaches the virtual contact position x is Dcar/Vmin, and therefore, a condition of both reaching the virtual contact position x at the same time is, $$Dcar/Vmin = Yped/Vped \quad (1).$$

Incidentally, in the positional relationship between the vehicle and the obstacle, the following condition is geometrically established.

$$(Ygap+d/2)/(Dcar-Dped) = (Yped+d/2)/Dcar$$

Here, Ygap is a lateral distance of the vehicle (a distance in a lateral direction between the vehicle and the potential risk area), d is a vehicle width, Dcar is a distance from the vehicle to the virtual contact position x, Dped is a distance from a wall to an obstacle, and Yped is a distance from the obstacle to the virtual contact position x. Therefore, the distance Yped from the obstacle to the virtual contact position x is defined as $$Yped = \{Dcar/(Dcar-Dped)\}(Ygap+d/2)-d/2 \quad (2).$$

By applying Equation (2) to Equation (1), the condition of Equation (1) becomes $$Vmin = Dcar/[\{Dcar/(Dcar-Dped)\}(Ygap+d/2)-d/2] \cdot Vped \quad (1a),$$

and the speed Vmin of the vehicle in the condition that the vehicle and the obstacle simultaneously arrive when the vehicle travels at the speed Vmin is represented by Dcar, Dped, Vped, and Ygap. Equation (1a) means that Dped, Vped, and Ygap are any values, and when the vehicle passes through the position of Dcar before the virtual contact position x at the vehicle speed Vmin, the vehicle comes into contact with the obstacle at the virtual contact position x in a case where the vehicle travels at the vehicle speed Vmin as it is when the obstacle begins to enter the scheduled traveling route from the boundary of the blind spot area (that is, in the above-described model, it is considered that, when an obstacle begins to enter after the vehicle has passed at the position Dcar at the vehicle speed Vmin, the vehicle passes through the virtual contact position x before the object reaches the virtual contact position x, such that contact is avoided).

On the other hand, in a case where the obstacle is recognized when the vehicle is in the position of Dcar before the virtual contact position x in the state of FIG. 5, the operation of the emergency avoidance braking is started at the deceleration dm, the vehicle speed is 0 until the vehicle reaches the virtual contact position x, and the vehicle stops, the following condition is satisfied.

$$Dcar = Vmin \cdot \tau + Vmin^2/(2dm) \quad (3)$$

Here, $\tau$ is a recognition time of the emergency avoidance braking from the recognition of the obstacle to the start of the deceleration (a time when the vehicle travels at Vmin). When Equation (3) is solved for Vmin, $$Vmin = dm[-\tau+(\tau^2+2Dcar/dm)^{1/2}] \quad (4)$$

is obtained. Thus, when the vehicle speed Vmin simultaneously satisfies Equations (1a) and (4), it is possible to stop the vehicle before the vehicle reaches the virtual contact position x, and therefore, the vehicle speed Vmin in this case may be set as the reference speed.

The reference speed Vmin satisfying Equations (1a) and (4) may be determined through numerical calculation. As understood from Equations (1a) and (4), the reference speed Vmin depends on Dcar. Therefore, in the numerical calculation, representative numerical values are used for the deceleration dm, a recognition time $\tau$, Dped, and Vped, and a value in any range as Dcar is sequentially applied to Equations (1a) and (4) for each lateral distance Ygap, and Vmin when Vmin calculated in both of the equations substantially match each other may be set to the reference speed Vmin (with respect to the lateral distance Ygap).

Figure 6:
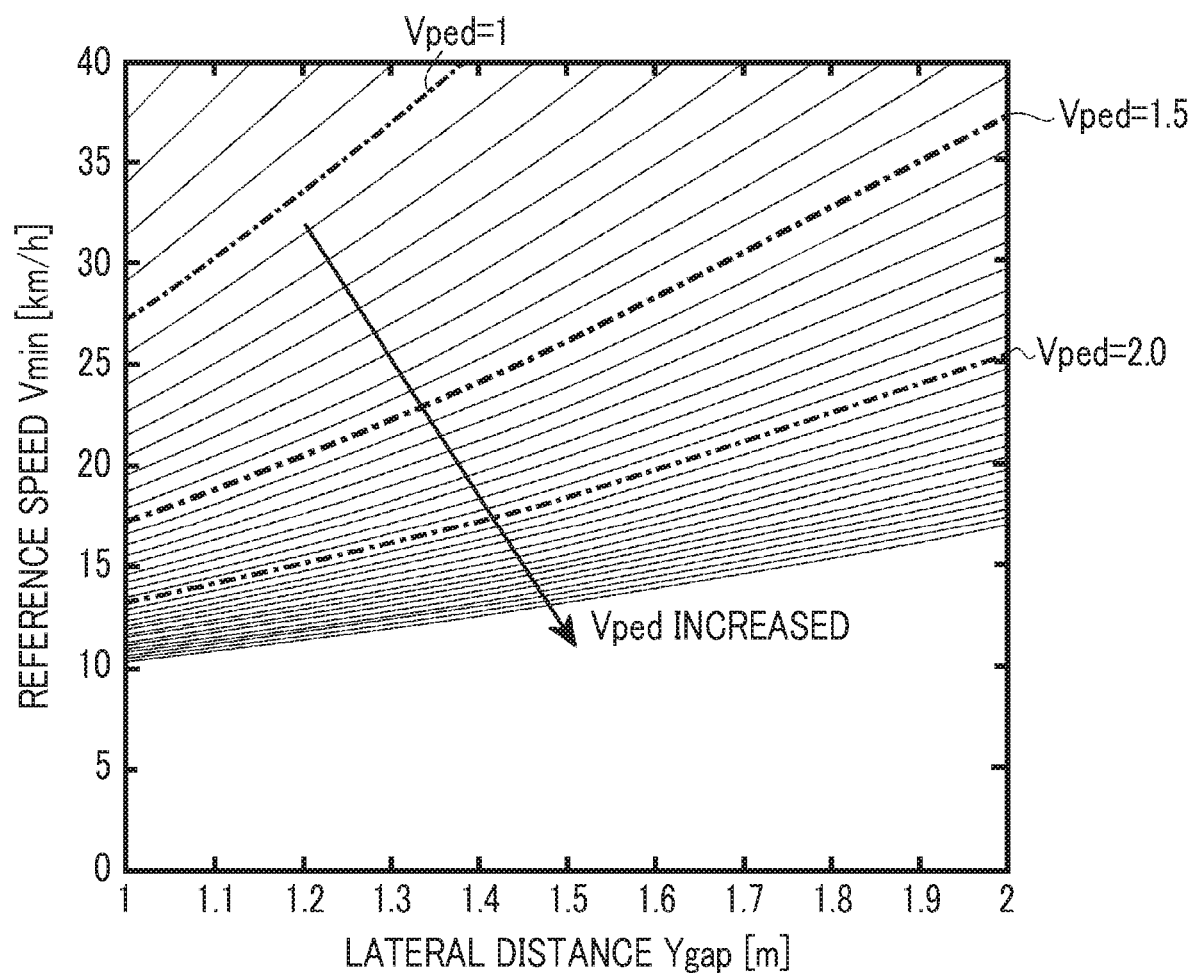
FIG. 6 is a diagram illustrating, in the form of a graph, a change in a reference speed with respect to a lateral distance of the vehicle from beside a road when an obstacle enters a scheduled traveling route of the vehicle from a potential risk area at a speed Vped, in which various values are assumed as the obstacle speed Vped.

FIG. 6 illustrates an example in which various Vped are set and the reference speed Vmin for a lateral distance Ygap is calculated through numerical calculation. In FIG. 6, deceleration dm=6 m/s, recognition time $\tau$=0.6 sec, Dped=1 m. As can be understood from FIG. 6, when the lateral distance Ygap decreases and a virtual pedestrian speed Vped increases, the reference speed Vmin decreases. The above description shows that when the lateral distance Ygap decreases or the virtual pedestrian speed Vped increases, a time when the obstacle reaches the virtual contact position x is shorter, and the emergency avoidance braking is operated after entry of the obstacle and a time taken for the vehicle to stop is shorter, and therefore, the reference speed needs to be low (on the other hand, when the lateral distance Ygap increases or the virtual pedestrian speed Vped decreases, a time which when the obstacle reaches the virtual contact position x is longer, and therefore, the minimum speed (reference speed) when the vehicle passes through the virtual contact position x earlier than the obstacle to avoid contact is increased).

In the embodiment, a map of the reference speed Vmin calculated for the lateral distance Ygap (representative numerical values may be used for the deceleration dm, the recognition time $\tau$, Dped, and Vped) may be prepared, and when a blind spot area or another potential risk area is detected during the actual traveling of the vehicle, a value of the reference speed Vmin may be selected from the map using the lateral distance Ygap measured at that time as a parameter.

Figure 3A:
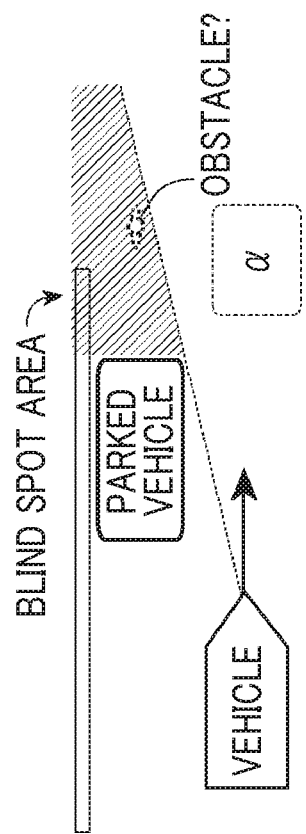
FIG. 3A is a diagram schematically illustrating an example of a traveling situation of a vehicle in which a potential risk area to which driving assistance of the driving assistance control device of the present embodiment is applied has been found.
Figure 3C:
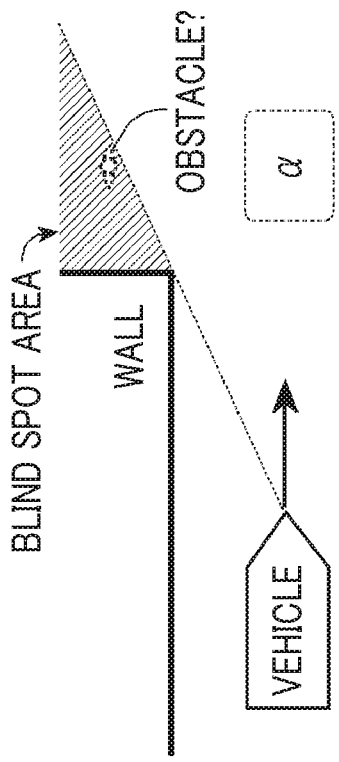
FIG. 3C is a diagram schematically illustrating an example of a traveling situation of a vehicle in which a potential risk area to which driving assistance of the driving assistance control device of the present embodiment is applied has been found.
Figure 3B:
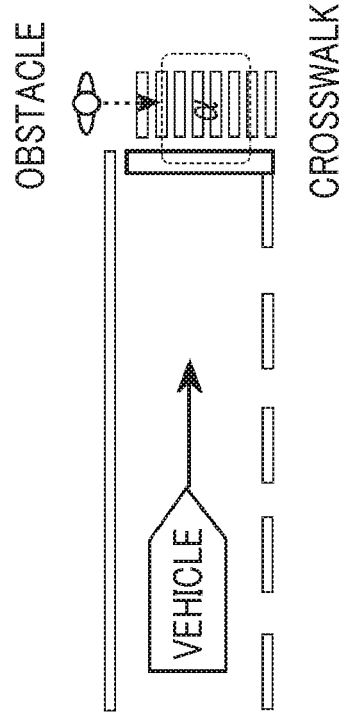
FIG. 3B is a diagram schematically illustrating an example of a traveling situation of a vehicle in which a potential risk area to which driving assistance of the driving assistance control device of the present embodiment is applied has been found.
Figure 3D:
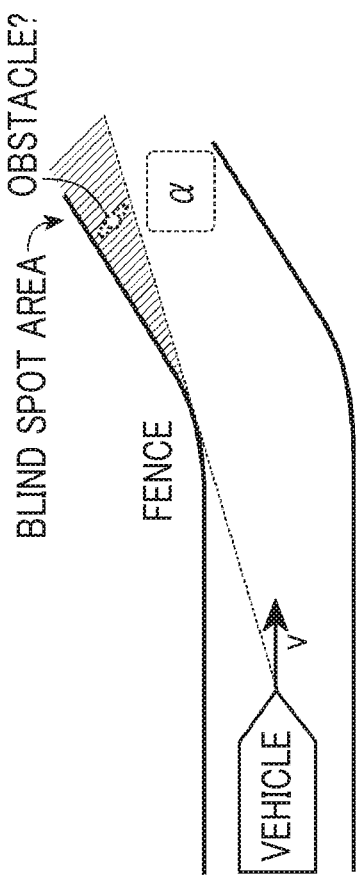
FIG. 3D is a diagram schematically illustrating an example of a traveling situation of a vehicle in which a potential risk area to which driving assistance of the driving assistance control device of the present embodiment is applied has been found.

The present disclosure is not limited to a scheme using the model as long as the speed of the vehicle allows avoidance of contact between the vehicle and the obstacle due to emergency avoidance braking even when the obstacle enters a scheduled traveling route of the vehicle from the potential risk area, and the reference speed may be calculated or determined using any method, and it should be understood that the case as described above falls within the scope of the present disclosure. For example, since $$Vmin = dm([\{Dcar/(Dcar-Dped)\}(Ygap+d/2)-d/2]/Vped-\tau) \quad (5)$$

is obtained from a conditional equation obtained from a condition that the vehicle is stopped due to emergency avoidance braking by a time Yped/Vped when the obstacle reaches the virtual contact position x:

$$Vmin/dm+\tau = Yped/Vped$$

and Equation (2) instead of the condition of Equation (1), Vmin satisfying Equations (5) and (4) may be set as the reference speed. It should be understood that, when an obstacle beside a road and/or a crosswalk is detected, the reference speed may be determined based on a positional relationship between a position at which there is the obstacle beside the road or an area beside the road of the crosswalk and the vehicle using any model, as illustrated in FIG. 3D.

(4) Determination and Generation of Assistance Reaction Force

When the potential risk area is detected, the reference speed is determined based on the positional relationship between the vehicle and the potential risk area as described above, and the current vehicle speed is higher than the reference speed, assistance for guiding driving so that the current vehicle speed is decelerated to the reference speed is executed. As described above, in the driving assistance according to the present embodiment, when the current vehicle speed is higher than the reference speed, the driver decreases the amount of manipulation or the pedal stroke of the active pedal, and the assistance reaction force is applied to the active pedal so that the target acceleration and deceleration is negative, that is, so that the vehicle is decelerated. The assistance reaction force as described above may be timely started to be applied at a time when the potential risk area is detected ahead in the traveling direction of the vehicle, and according to the above-described content, driving assistance is provided so that pre-reading driving based on prediction of the potential risk is achieved before the vehicle reaches the vicinity of the potential risk area.

In the determination of the assistance reaction force, specifically, the potential risk index value PR may be calculated as follows using the current vehicle speed V and the reference speed Vmin.

$$PR=(V-Vmin)/Vmin=V/Vmin-1 \quad (6)$$

The potential risk index value PR indicates a degree of the potential risk, and indicates that, in a case where the obstacle rushes in reality, contact with the obstacle can be avoided through emergency avoidance braking when PR<0, and it is difficult to avoid contact with the obstacle when PR>0 and the value increases. The assistance reaction force Fa may be applied according to the following equation using the potential risk index value PR and the amount of manipulation or the pedal stroke θa of the active pedal.

(i) When PR<0

$$Fa=0 \quad (7a)$$

(ii) When 0<PR<1, $$Fa=Kmax \cdot PR \cdot \theta a \quad (7b)$$

(iii) When 1<PR, $$Fa=Kmax \cdot \theta a \quad (7c).$$

Here, Kmax is a reaction force adjustment gain (constant) that defines the maximum value of the generated assistance reaction force. As understood from the above equation, the assistance reaction force Fa is generated solely when PR>0. FIG. 7 is a graph diagram showing a magnitude (numerical value) of the assistance reaction force Fa with respect to the stroke θa (horizontal axis) of the active pedal and the current vehicle speed V (vertical axis) using iso-force lines (in the illustrated example, Kmax=2 is set). As can be understood from FIG. 7, when the pedal stroke θa increases and a difference by which the current vehicle speed V exceeds the reference speed Vmin (26.3 km/h in the illustrated example) increases, the assistance reaction force Fa increases.

Specifically, the assistance reaction force calculated as described above may be applied to the active pedal 14 by the assistance reaction force generator 15 included in the active pedal 14. In the assistance reaction force generator 15, a mechanism capable of causing a force to act on the active pedal 14 in a direction in which the pedal stroke is decreased in any manner such as a hydraulic, pneumatic, electromagnetic, or mechanical manner may be adopted. With the configuration as described above, the pedal stroke θa is guided to the deceleration side until the current vehicle speed V is decreased to the reference speed Vmin (when the driver does not manipulate or depress the pedal, the pedal stroke θa is reduced as it is to the minimum value due to the assistance reaction force.), and the driver can grasp whether or not the current vehicle speed V is decelerated to the reference speed Vmin or how much the current vehicle speed V exceeds the reference speed Vmin by feeling the assistance reaction force Fa in a tactile manner through a foot or hand manipulating or depressing the active pedal. Further, when the driver observes a surrounding environment of the vehicle and does not intend to decelerate the vehicle speed to the reference speed Vmin of the current vehicle speed V, overriding for the deceleration control by driving assistance can be performed by applying a force beyond the assistance reaction force Fa to the active pedal. That is, in the configuration of the present embodiment, driving assistance is provided in an aspect in which a driving authority can be shared between the device and the driver while guiding the driving so that the pre-reading driving based on the prediction of the potential risk is achieved, as described above.

The assistance reaction force actually generated by the assistance reaction force generator 15 may preferably be a first order lag value of Fa calculated using Equations (7a) to (7c) above. When there is a significant difference between the current vehicle speed V and the reference speed Vmin at a time when the potential risk area is detected ahead in the traveling direction of the vehicle and the potential risk index value is a significant value, Fa calculated according to Equations (7b) to (7c) is likely to rapidly occur. When the vehicle passes through the potential risk area without rushing out of the obstacle, Fa may be set to 0 since the assistance reaction force is not needed, but in this case, Fa calculated according to Equations (7b) to (7c) is likely to rapidly disappear. When a sudden change in the assistance reaction force that actually acts on the active pedal as described above occurs, the driver is likely to feel uncomfortable. Therefore, in the embodiment, a force corresponding to a value (first order lag value of Fa) obtained by Fa calculated from the potential risk index value passing through a transfer function of a first order lag system may be actually generated by the assistance reaction force generator 15 as the assistance reaction force, as described above. Accordingly, it is expected that the change in the assistance reaction force to be applied to the active pedal becomes gentle and the uncomfortableness felt by the driver is reduced.

(5) Example of Driving Assistance Control

Figure 8A:
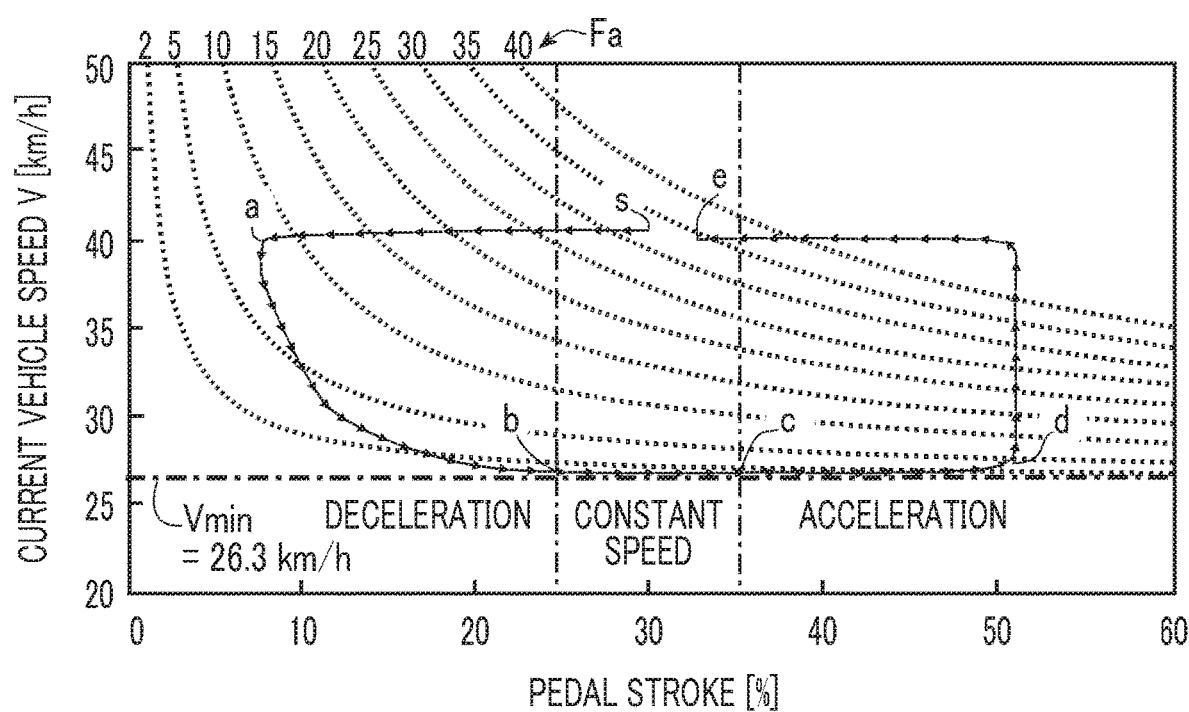
FIG. 8A illustrates a graph showing a magnitude of the assistance reaction force Fa to be applied to the active pedal similar to that in FIG. 7, in which an example of routes (s to e) showing a history of a change in a typical active pedal stroke and a current vehicle speed V is drawn.
Figure 8B:
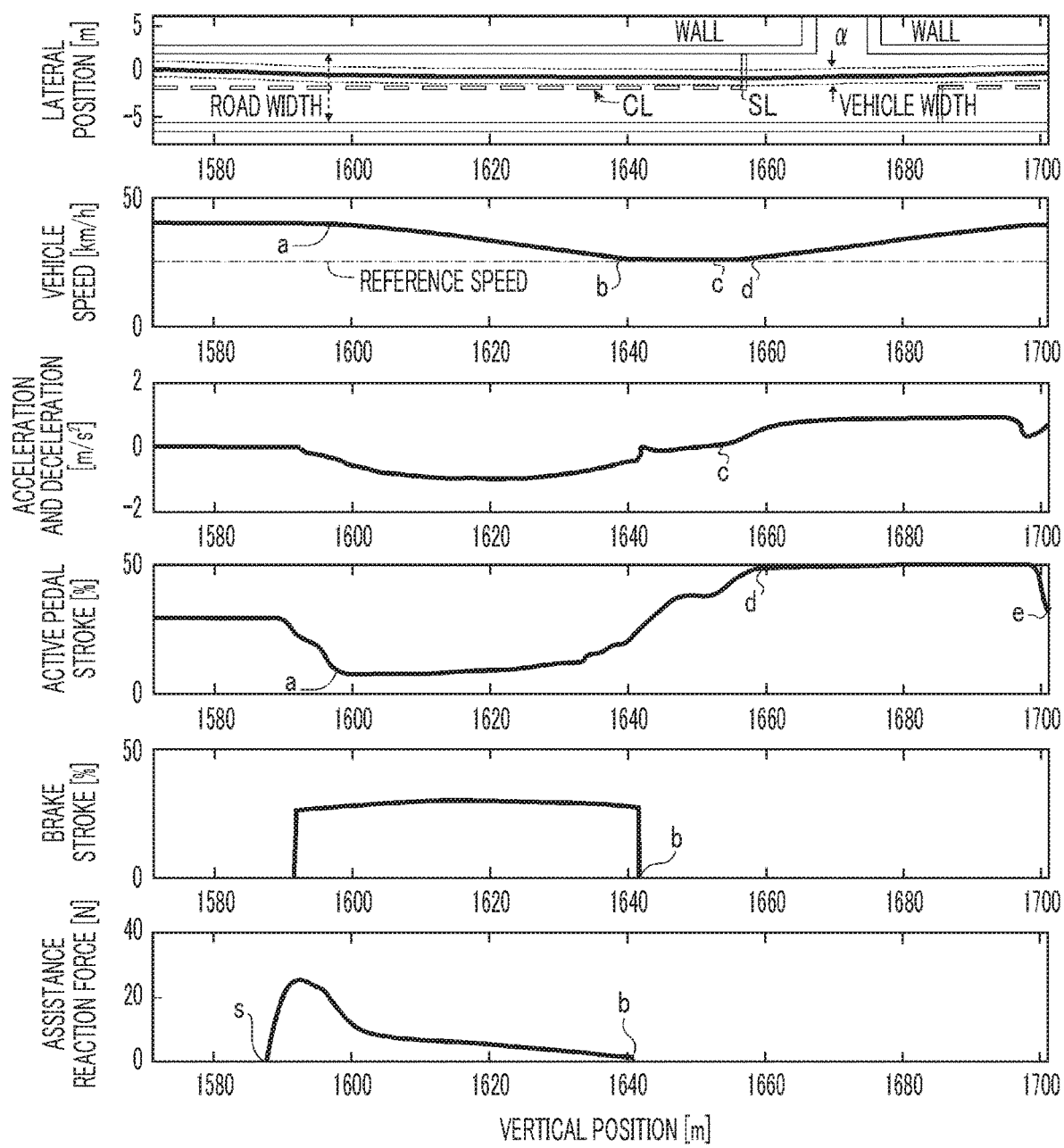
FIG. 8B is a diagram illustrating a trajectory (top) of a vehicle when a stroke of the active pedal and the current vehicle speed V are changed in the route illustrated in FIG. 8A, and a change in a vehicle speed, an acceleration and deceleration, an active pedal stroke, a brake stroke (a braking force generated by a system), and an assistance reaction force.

FIGS. 8A and 8B illustrate an example of a change in the driving state of the vehicle when driving assistance control based on the prediction of the potential risk by the device of the present embodiment (obtained by simulation) is executed. An uppermost horizontal position in FIG. 8B shows a trajectory of the vehicle when the vehicle passes in front of the blind spot area α (a shape of the road is also drawn). An arrow line in FIG. 8A is drawn on a graph showing a history of the change in the pedal stroke and the vehicle speed in driving along the vehicle trajectory in FIG. 8B using an assistance reaction force Fa that is the same as that in FIG. 7 as iso-force lines. The vehicle speed, the acceleration and deceleration, the active pedal stroke, the brake stroke, and the assistance reaction force in FIG. 8B indicate changes in respective states during driving along the vehicle trajectory in FIG. 8B. Referring the above figures, in the illustrated example, first, the blind spot area α is found at a point s in FIG. 8A, and when the assistance reaction force is increased, the assistance reaction force is started to increase. The pedal stroke is decreased in response to the increase in the assistance reaction force. When the pedal stroke enters a deceleration range, the brake device is operated (points s to a; the brake stroke value has a significant value). Deceleration of the vehicle is executed (points a to b). Here, since the vehicle speed decreases and the assistance reaction force gradually decreases, the pedal stroke gradually increases in correspondence with the above. Thereafter, when the vehicle speed is decelerated approximately to the reference speed before the vehicle reaches in front of the blind spot area α (point b), the assistance reaction force becomes 0, the operation of the brake device is stopped (the brake stroke value is 0), and the vehicle speed is maintained while the pedal stroke is in a constant speed range (points b to c). Thereafter, when the active pedal is stepped on before the vehicle passes in front of the blind spot area α and the pedal stroke enters the acceleration range (points c to d), the vehicle speed gradually increases (from point d).

Thus, as described above, according to the device of the present embodiment, when the potential risk area (blind spot area) is detected during traveling of the vehicle, the assistance reaction force is applied to the active pedal, the active pedal stroke is decelerated, and the assistance reaction force is generated until the vehicle speed is decreased to the reference speed, and driving is guided so that the pre-reading driving based on the prediction of the potential risk is achieved as described above. However, the deceleration control as described above is overridden by the driver manipulating the active pedal, and even before the vehicle passes in front of the potential risk area (blind spot area), the vehicle can be accelerated when the pedal stroke enters the acceleration range.

Although the above description has been made in connection with the embodiments of the present disclosure, it will be apparent to those skilled in the art that many modifications and variations can be made and that the present disclosure is limited solely to the illustrated embodiments and is applicable to various devices without departing from the concept of the present disclosure.

In the aspect of the present disclosure, the force feedback unit may be configured to increase the assistance reaction force to be applied to the active pedal as a difference by which the current speed exceeds the reference speed is greater.

In the aspect of the present disclosure, the force feedback unit may be configured to increase the assistance reaction force to be applied to the active pedal as the amount of manipulation of the active pedal is larger.

when a potential risk index value represented by V/Vmin−1 using the current speed V and the reference speed Vmin is equal to or greater than 0 and equal to or smaller than 1, the force feedback unit may be configured to increase the assistance reaction force to be applied to the active pedal as the potential risk index value is greater.

In the aspect of the present disclosure, the reference speed may be a speed at which contact between the vehicle and the obstacle is avoided due to emergency avoidance braking even when the obstacle enters the scheduled traveling route of the vehicle from the potential risk area.

In the aspect of the present disclosure, the electronic control unit may be configured to calculate the reference speed based on a distance in a lateral direction between the vehicle and the potential risk area.

In the aspect of the present disclosure, the potential risk area may be a blind spot area when viewed from the vehicle.

In the aspect of the present disclosure, the assistance reaction force to be applied by the force feedback unit may be proportional to a first order lag value of the potential risk index value.

What is claimed is:

1. A driving assistance control device comprising:
an active pedal configured to control a driving force and a braking force of a vehicle such that the vehicle is accelerated when an amount of manipulation exceeds a first predetermined value and the vehicle is decelerated when the amount of manipulation falls below a second predetermined value equal to or smaller than the first predetermined value; and
an electronic control unit configured to
detect a potential risk area, the potential risk area being an area in which an obstacle entering a scheduled traveling route of the vehicle in a traveling direction of the vehicle is likely to be present,
determine a reference speed based on a positional relationship between the vehicle and the potential risk area, the reference speed being a speed of the vehicle at which contact between the vehicle and the obstacle is avoided even when the obstacle enters the scheduled traveling route of the vehicle from the potential risk area when the potential risk area is detected,
cause a force to be applied to the active pedal when a current speed of the vehicle exceeds the reference speed, and
increase the force applied to the active pedal when the amount of manipulation of the active pedal is increased,
wherein the force is applied in a direction in which the amount of manipulation is reduced,
wherein the obstacle is a pedestrian,
wherein when a potential risk index value represented by V/Vmin−1 using the current speed V and the reference speed Vmin, is equal to or greater than 0 and equal to or smaller than 1, the electronic control unit is further configured to increase the force to be applied to the active pedal as the potential risk index value is greater,
wherein when the potential risk index value is smaller than 0, the force applied to the active pedal is 0,
wherein when the potential risk index value is greater than 0 and smaller than 1, the force applied to the active pedal is generated using a maximum value of the force, the potential risk index value, and the amount of manipulation of the active pedal, and
wherein when the potential risk index value is greater than 1, the force applied to the active pedal is generated using the maximum value of the force and the amount of manipulation of the active pedal.

2. The driving assistance control device according to claim 1, wherein the electronic control unit is further configured to increase the force applied to the active pedal as a difference between the current speed and the reference speed is increased.

3. The driving assistance control device according to claim 1, wherein the reference speed is a speed at which contact between the vehicle and the obstacle is avoided due to emergency avoidance braking even when the obstacle enters the scheduled traveling route of the vehicle from the potential risk area.

4. The driving assistance control device according to claim 1, wherein the electronic control unit is configured to calculate the reference speed based on a distance in a lateral direction between the vehicle and the potential risk area.

5. The driving assistance control device according to claim 1, wherein the potential risk area is a blind spot area when viewed from the vehicle.

6. The driving assistance control device according to claim 1, wherein the force to be applied to the active pedal is proportional to a first order lag value of the potential risk index value.

7. The driving assistance control device according to claim 1, wherein the braking force is applied by a hydraulic brake device.

* * * * *